United States Patent
Yu (10) Patent No.: US 8,755,006 B2
(45) Date of Patent: Jun. 17, 2014

(54) BACK PLATE OF BACKLIGHT MODULE AND MANUFACTURING METHOD THEREOF

(75) Inventor: Chia-Hsin Yu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 369 days.

(21) Appl. No.: 12/907,202

(22) Filed: Oct. 19, 2010

(65) Prior Publication Data

US 2011/0038176 A1    Feb. 17, 2011

Related U.S. Application Data (63) Continuation of application No. 12/204,243, filed on Sep. 4, 2008, now Pat. No. 7,898,616.

(30) Foreign Application Priority Data

Oct. 31, 2007    (TW) .............................. 96141042 A (51) Int. Cl.
  *G02F 1/1335*    (2006.01)
  *G09G 3/36*    (2006.01)
  *B21D 31/00*    (2006.01)

(52) U.S. Cl.
  CPC ............ *G02F 1/1335* (2013.01); *G02B 6/0036* (2013.01); *G02B 6/0038* (2013.01); *G02B 6/0055* (2013.01); *G02B 6/0068* (2013.01)
  USPC .......... 349/65; 345/102; 72/379.2; 312/223.5

(58) Field of Classification Search
  CPC .. G02F 1/1335; G02B 6/0036; G02B 6/0038; G02B 6/0055; G02B 6/0068
  USPC .......... 349/65; 345/102; 72/379.2; 312/223.5
  See application file for complete search history.

(56) References Cited

U.S. PATENT DOCUMENTS

| | | | |
|---|---|---|---|
| 7,167,365 B2 | 1/2007 | Fu et al. | |
| 7,172,329 B2 | 2/2007 | Kao et al. | |
| 2005/0213291 A1* | 9/2005 | Chi ............................. | 361/681 |
| 2006/0180587 A1 | 8/2006 | Helms | |
| 2007/0046859 A1 | 3/2007 | Huang et al. | |
| 2007/0172193 A1 | 7/2007 | Chang | |

FOREIGN PATENT DOCUMENTS

| | | |
|---|---|---|
| CN | 2079603 | 6/1991 |
| CN | 1538218 | 10/2004 |
| CN | 1560677 A | 1/2005 |

(Continued)

OTHER PUBLICATIONS

Listing of pertinent parts of US 200610180587 A1, (Publication date Aug. 17, 2006).

(Continued)

*Primary Examiner* — Jerry Blevins
(74) *Attorney, Agent, or Firm* — McClure, Qualey & Rodack, LLP (57) ABSTRACT

A back plate includes an inner part, a bottom part, an outer part, a folded part and a fastener. The bottom part is connected to the inner part for providing a container space. The outer part is opposite the inner part. The folded part is connected with the outer part and the inner part. The fastener is disposed on the outer part. A method for manufacturing the back plate is also disclosed herein.

19 Claims, 7 Drawing Sheets

(56) References Cited

FOREIGN PATENT DOCUMENTS

| | | |
|---|---|---|
| CN | 101030000 | 9/2007 |
| TW | 200714979 | 4/2007 |
| TW | M311046 | 5/2007 |
| TW | I287153 | 9/2007 |
| TW | I287678 | 10/2007 |
| TW | 200523632 | 10/2010 |
| WO | 2007037038 | 4/2007 |

OTHER PUBLICATIONS

English language translation of abstract of CN 2079603 (publication date Jun. 26, 1991).
English language translation of abstract of CN 1538218 (publication date Oct. 20, 2004).
English language translation of abstract of TW 200523632 (publication date Jul. 16, 2005).
English language translation of abstract of WO 2007037038 (publication date Apr. 5, 2007).
English language translation of abstract of TW 200714979 (publication date Apr. 16, 2007).
English language translation of abstract of TW M311046 (publication date May 1, 2007).
English language translation of abstract of CN 101030000 (publication date Sep. 5, 2007).
English language translation of abstract of TW I287153 (publication date Sep. 21, 2007).
English language translation of abstract of TW I287678 (publication date Oct. 1, 2007).
Taiwanese language Notice of Allowance dated May 7, 2010.
English language translation of Taiwanese language Notice of Allowance, (dated May 5, 2010).
English translation of abstract and pertinent parts of CN 1560677 A (published Jan. 5, 2005).

\* cited by examiner

BACK PLATE OF BACKLIGHT MODULE AND MANUFACTURING METHOD THEREOF

CROSS REFERENCE TO RELATED APPLICATIONS

This application is a continuation of U.S. patent application Ser. No. 12/204,243, filed Sep. 4, 2008, which claims priority to Taiwan Patent Application Serial Number 96141042, filed Oct. 31, 2007. The contents of these prior applications are incorporated herein by reference.

BACKGROUND

1. Field of Invention

The present invention relates to a backlight module. More particularly, the present invention relates to a structural component of a backlight module.

2. Description of Related Art

A conventional liquid crystal display (LCD) includes a color filter, a backlight module, a driving circuit, an optical film, and a glass substrate. The backlight module is necessary to display image data because liquid crystals do not self-illuminate.

The backlight module includes a back plate and an upper frame. The back plate and the upper frame are coupled together to provide a container space. The container has a space to contain a light source and an optical component therein. In this way, the light source can be coupled with the LCD to provide light to the display area of the LCD.

The back plate has a hook coupled to the upper frame to fix the upper frame on the back plate and a conventional process to make the hook needs to punch a hole on the back plate. However, this hole may provide a path for dust to penetrate inside the backlight module and the dust inside the backlight module may cause bright/dark spot defects. Furthermore, the dust inside the backlight module may also cause vibration test failure.

Moreover, the light provided by the light source, e.g. a cold cathode fluorescent tube (CCFL), may leak through the hole, and thus the lighting efficiency is decreased by the hole on the back plate.

SUMMARY

According to one embodiment of the present invention, a back plate includes an inner part, a bottom part, an outer part, a folded part and a fastener. The bottom part is connected to the inner part to provide a container space. The outer part is in contact with the inner part. The folded part is connected with the outer part and the inner part. The fastener is disposed on the outer part.

According to another embodiment of the present invention, a backlight module includes a back plate, an upper frame and a light source. The back plate includes an inner part, a bottom part, an outer part, a folded part and a fastener. The bottom part is connected to the inner part to provide a container space. The outer part is opposite the inner part. The folded part is connected with the outer part and the inner part. The fastener is disposed on the outer part. The upper frame is coupled to the fastener. The light source is disposed in the container space.

According to yet another embodiment of the present invention, a method for manufacturing a back plate includes the following steps:

(a) forming a protrusion on the inner surface of a half shell; and (b) folding at least part of the half shell outwards such that the protrusion faces outside of the half shell.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the embodiments of the present invention, examples of which are illustrated in the accompanying drawings. Wherever possible, the same reference numbers are used in the drawings and the description to refer to the same or like parts.

Figure 1:
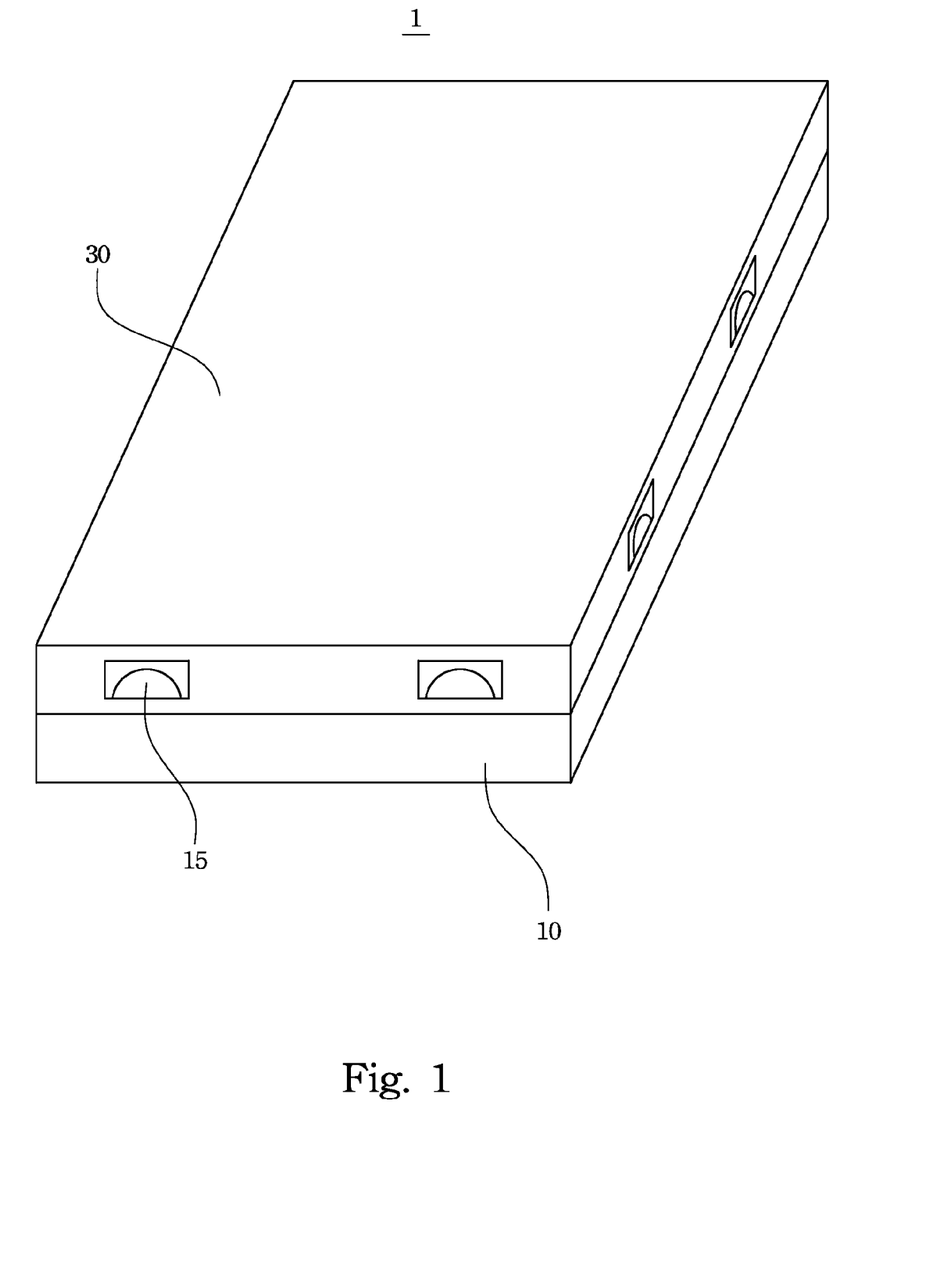
FIG. 1 is a three-dimensional view of a backlight module according to one embodiment of the present invention.

FIG. 1 is a three-dimensional view of a backlight module according to one embodiment of the present invention. A backlight module 1 includes a back plate 10 and an upper frame 30. The back plate 10 has at least one fastener 15 disposed thereon. The upper frame 30 is coupled to the fastener 15 of the back plate 10 such that the upper frame 30 can be fixed on the back plate 10.

Figure 2:
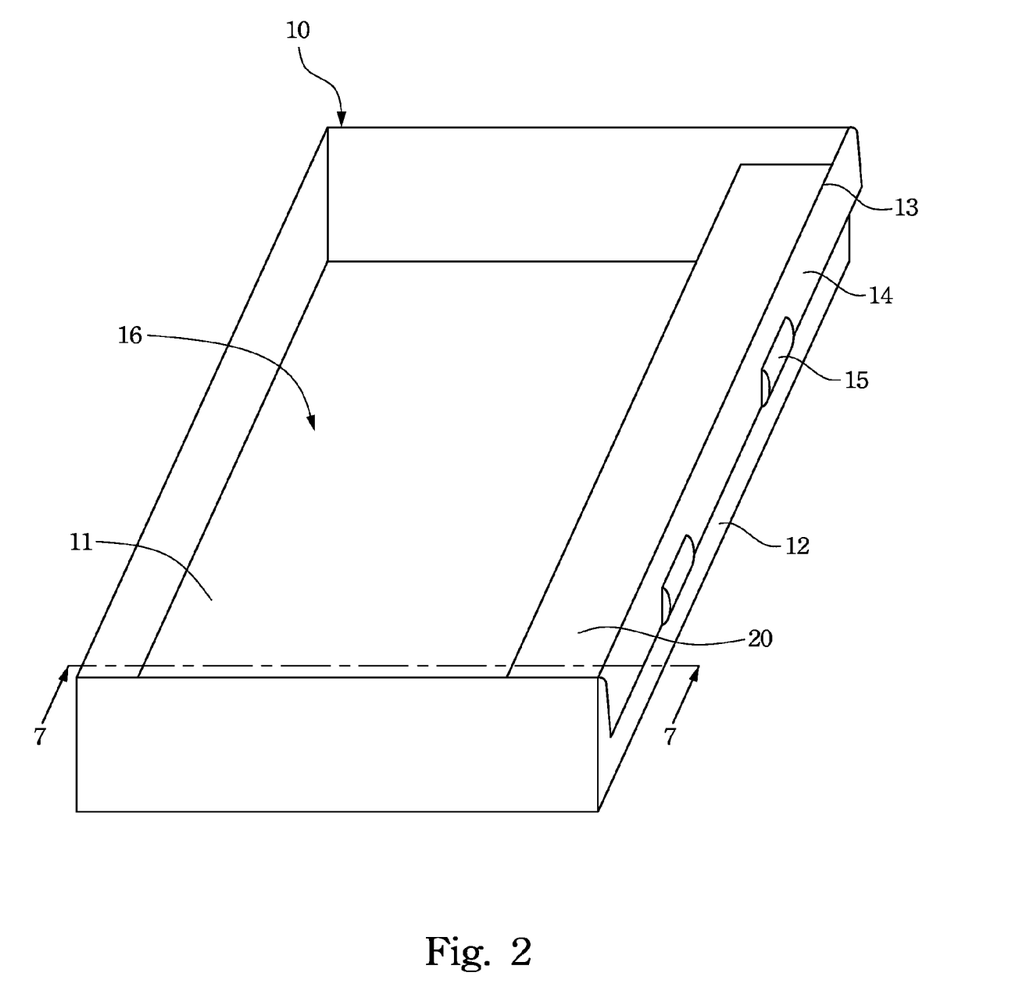
FIG. 2 shows the backlight module of FIG. 1 after its upper frame is removed.

FIG. 2 shows the backlight module 1 of FIG. 1 after its upper frame 30 is removed. The back plate 10 of FIG. 2 further includes an inner part 12, a bottom part 11, an outer part 14 and a folded part 13. The bottom part 11 is connected to the inner part 12 to provide a container space 16. The outer part 14 is opposite the inner part 12. That is, the outer part 14 is disposed outside the container space 16. The folded part 13 is connected with the outer part 14 and the inner part 12. The fastener 15, where the upper frame 30 (shown in FIG. 1) is coupled, is disposed on the outer part 14, and thus the inner surface of the inner part 12, facing the container space 16, is flat without any holes or slits that allow dust to penetrate through. Moreover, the light leakage problem can be solved by the flat inner surface of the inner part 12 as well.

As shown in FIG. 2, the fastener 15 may be formed on the edge of the outer part 14 by mechanical stamping, and thus there is no hole or slit on the outer part 14 that allows dust to penetrate through. Moreover, the light leakage problem can be eliminated by forming the fastener 15 on the edge of the outer part 14 as well.

Figure 3:
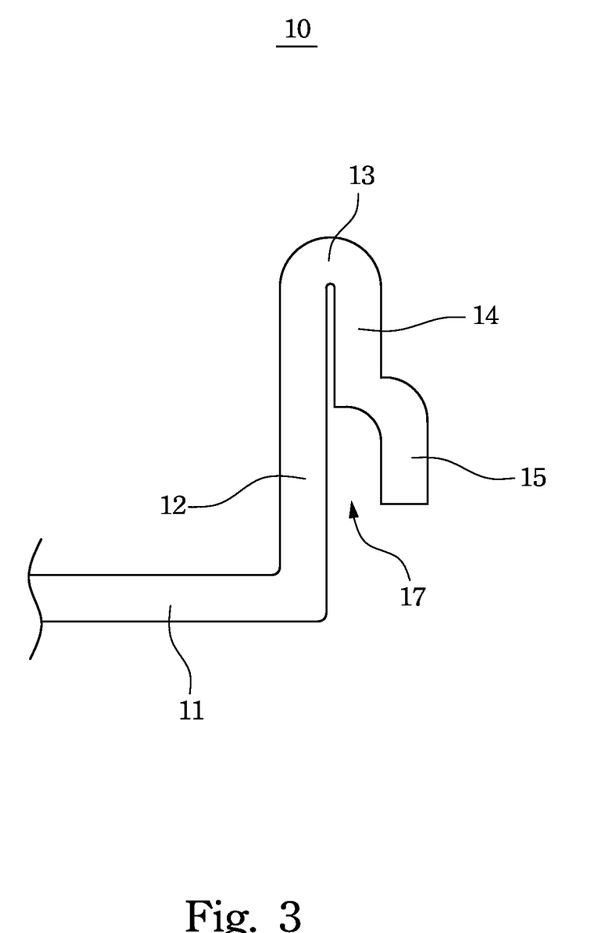
FIG. 3 is a side view of the back plate of FIG. 1.

FIG. 3 is a side view of the back plate 10 of FIG. 1. The fastener 15 may stick out to fasten the upper frame 30 (shown in FIG. 1) and the back plate 10 together. More specifically, the fastener 15 may be a male fastener protruding from the outer surface of the outer part 14, facing away from the inner part 12. Moreover, the fastener 15 may have a concavity 17 disposed in the bottom surface of the fastener 15, facing away from the folded part 13, because the fastener 15 is formed by mechanical stamping. It is easily understood that the shape of the fastener 15 shown in FIG. 3 is only one of the examples. That is, the fastener may permissibly have a different shape than that shown in FIG. 3 within the scope of the invention if its fastening capability is not materially altered.

Figure 4:
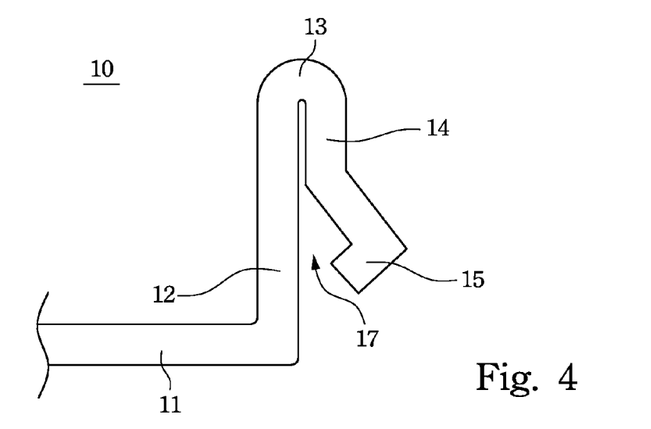
FIG. 4 is a side view of the back plate according to another embodiment of the present invention.

For example, the fastener 15 of FIG. 4 has substantially the same structure as that shown in FIG. 3, i.e. a male fastener with a concavity 17 disposed therein. However, the concavity 17 has a shrink-opening on the bottom surface of the fastener 15.

Figure 5:
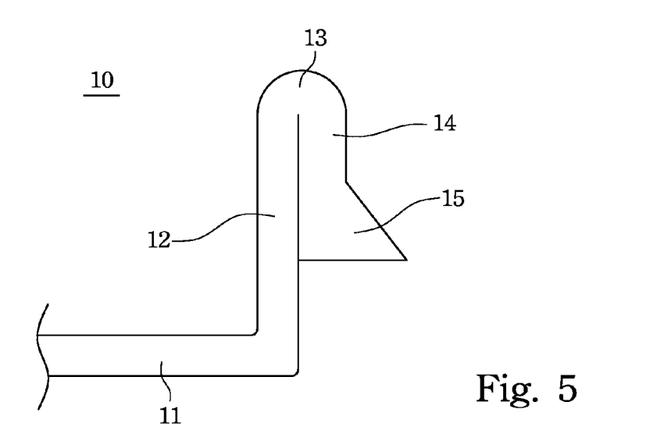
FIG. 5 is a side view of the back plate according to yet another embodiment of the present invention.

Alternatively, the fastener 15 may be a solid male fastener (as shown in FIG. 5). That is, the fastener 15 of FIG. 5 does not have the concavity disposed therein. Accordingly, the fastener 15 can be rugged enough for heavy use. Furthermore, this fastener 15 also leaves no space, i.e. concavity, for dust to settle into.

Figure 6:
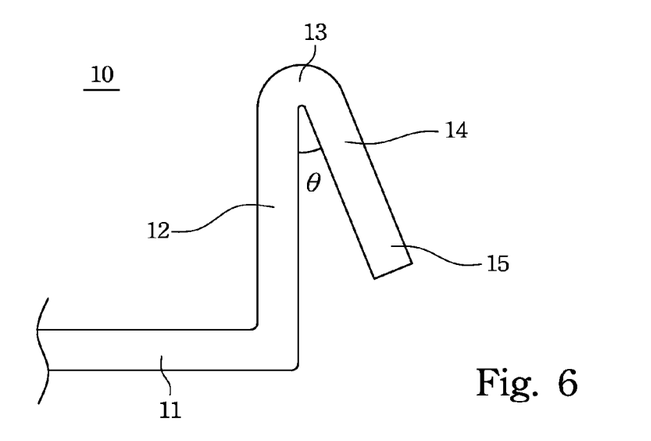
FIG. 6 is a side view of the back plate according to still another embodiment of the present invention.

Although FIG. 3, FIG. 4 and FIG. 5 show the outer part 14 is parallel with the inner part 12 (as shown in FIG. 3 and FIG. 4) or is in contact with the inner part 12 (as shown in FIG. 5), the outer part may not be parallel with the inner part as well. For example, FIG. 6 shows the outer part 14 and the inner part 12 may be at an angle θ to each other. It would be appreciated by a person skilled in the art that the relationship between the outer part and the inner part could permissibly vary within the scope of the invention according to actual requirements.

The inner part 12, the folded part 13 and the outer part 14 of FIG. 3 may be made as one piece. That is, the material of the inner part 12, the material of the folded part 13, and the material of the outer part 14 may be the same. It is easily understood that the relationship among the inner part, the folded part and the outer part could permissibly vary within the scope of the invention. For example, the inner part, the folded part and the outer part may be coupled together according to another embodiment of the present invention.

Furthermore, the inner part 12 and the bottom part 11 of FIG. 3 may be made as one piece as well. That is, the material of the inner part 12 and the material of the bottom part 11 may be the same. In addition, the inner part 12 may be substantially perpendicular to the bottom part 11. Similarly, the relationship between the inner part and the bottom part could permissibly vary within the scope of the invention as well. For example, the inner part and the bottom part may be coupled together according to another embodiment of the present invention.

Figure 7:
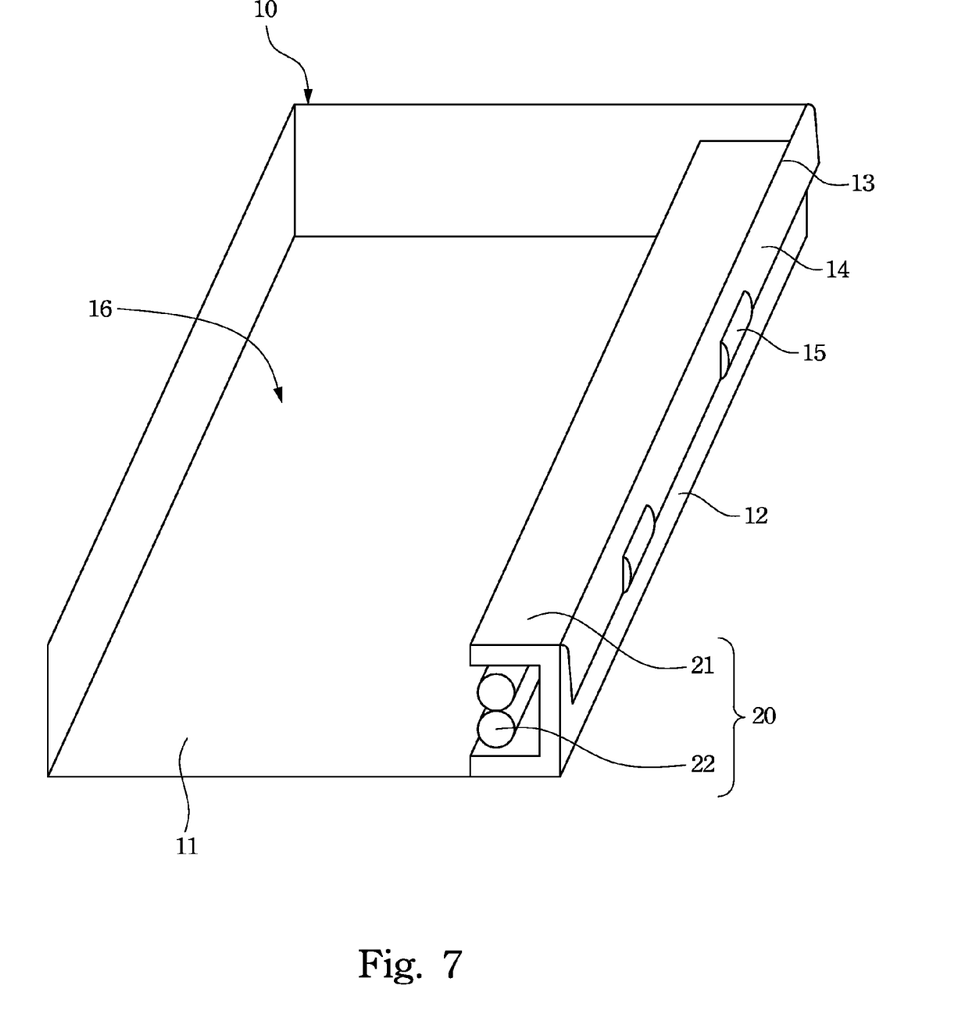
FIG. 7 is a cross-section view taken along line 7-7 of FIG. 2.

FIG. 7 is a cross-section view taken along line 7-7 of FIG. 2. There may be a light source 20 disposed in the container space 16. The light source 20 includes a tube lamp 22 and a reflector 21. The reflector 21 is attached to the inner part 12 of the back plate 10. This reflector 21 may cover at least part of the emitting surface of the tube lamp 22 to reflect the light provided by the tube lamp 22 to the light guide plate (not shown) or the liquid crystals (not shown).

Figure 8A:
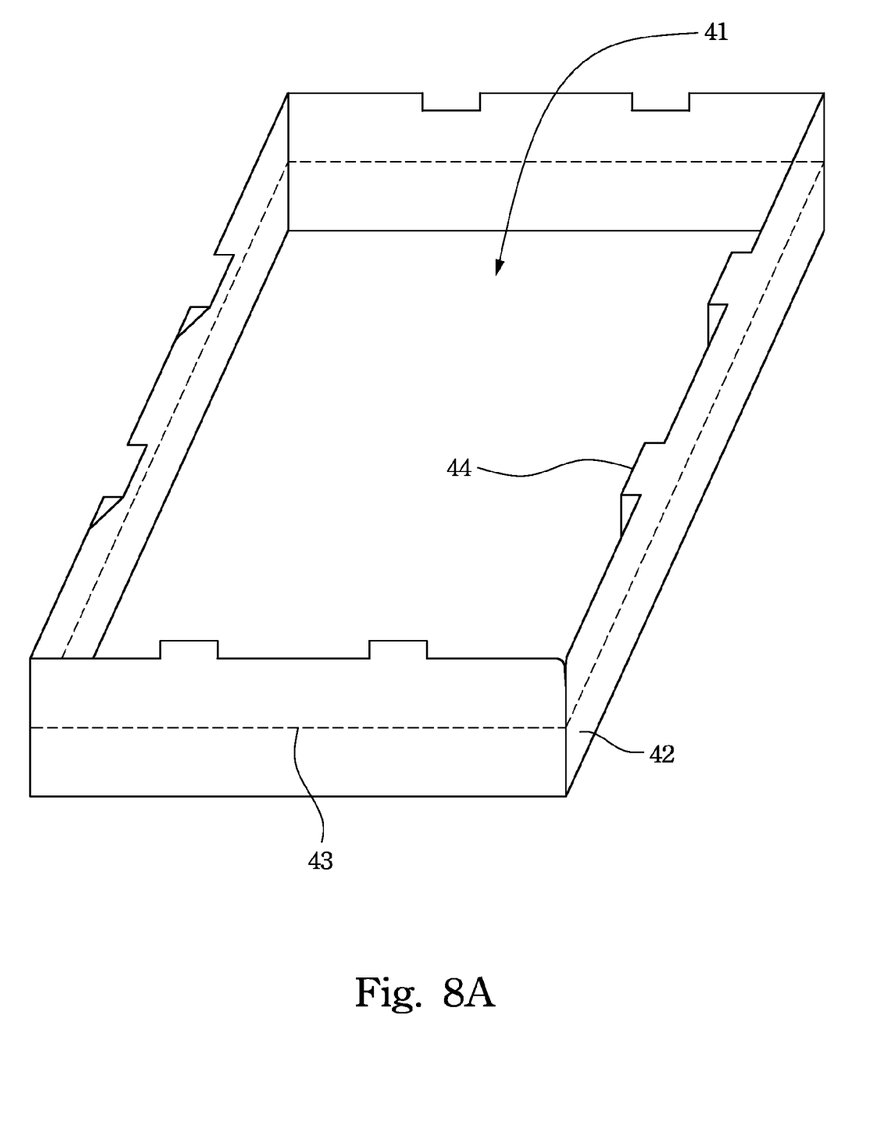
FIG. 8A and FIG. 8B illustrate a method for manufacturing the back plate of FIG. 1.
Figure 8B:
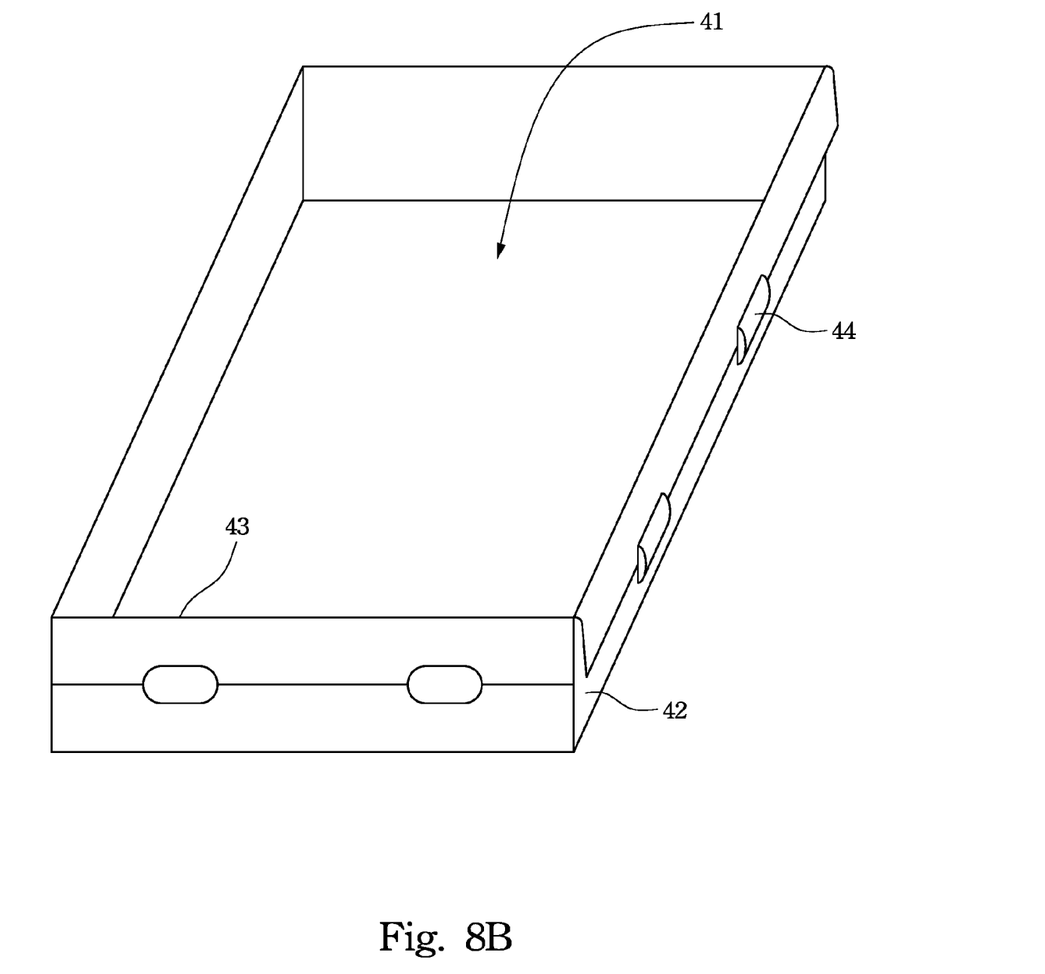

FIG. 8A and FIG. 8B illustrate a method for manufacturing the back plate 10 of FIG. 1. First, a protrusion 44 is formed on the inner surface of a half shell 42 (as shown in FIG. 8A). That is, the protrusion 44 protrudes inside the half shell 42, i.e. the container space 41, in this step. In the present embodiment, both the protrusion 44 and the half shell 42 may be made of metal.

Then, at least part of the half shell 42 is folded outwards along the fold line 43. After this step, the protrusion 44 faces outside of the half shell 42 to be a fastener, where the upper frame is coupled (as shown in FIG. 8B). In the present embodiment, the folding step may comprise mechanical stamping.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A back plate comprising:
   a bottom plate having a periphery;
   an inner side frame having a top edge and a bottom edge secured on the periphery, the top edge being coupled directly to the bottom edge, wherein the inner side frame extends upwards from the periphery and surrounds the bottom plate to form a container space, the inner side frame having a first surface facing the container space and a second surface opposite to the first surface;
   a folded portion extending from the top edge of the inner side frame in a direction vertical to the top edge and turned back to the second surface of the inner side frame, and thus forming a ridge extending in a direction parallel to the top edge;
   an outer strip positioned out of the container space, wherein the outer strip is secured on the folded portion and extends downwards from the folded portion, so that a gap is formed between the outer strip and the inner side frame, wherein the outer strip and the bottom plate are respectively disposed at opposite sides of the inner side frame; and
   a fastener disposed on the outer strip.

2. The back plate of claim 1, wherein the outer strip has an outer surface facing away from the inner side frame, and the fastener is a male fastener protruding from the outer surface of the outer strip.

3. The back plate of claim 1, wherein the inner side frame and the bottom plate are made as one piece.

4. The back plate of claim 1, wherein the material of the inner side frame and the material of the bottom plate are the same.

5. The back plate of claim 1, wherein the fastener has a bottom surface and a concavity disposed on the bottom surface.

6. The back plate of claim 1, wherein the inner side frame, the outer strip, and the fastener are made as one piece.

7. The back plate of claim 1, wherein the material of the inner side frame, the material of the outer strip, and the material of the fastener are the same.

8. The back plate of claim 1, wherein the first surface is flat.

9. A backlight module comprising:
   a back plate according to claim 1;
   an upper frame disposed on and aligned with the back plate, wherein the upper frame includes a side wall having an closed-opening, and the fastener penetrates through the closed-opening; and
   a light source disposed in the container space.

10. The backlight module of claim 9, wherein the outer strip has an outer surface facing away from the inner side frame, and the fastener is a male fastener protruding from the outer surface of the outer strip.

11. The backlight module of claim 9, wherein the inner side frame and the bottom plate are made as one piece.

12. The backlight module of claim 9, wherein the material of the inner side frame and the material of the bottom plate are the same.

13. The backlight module of claim 9, wherein the fastener has a bottom surface and a concavity disposed on the bottom surface.

14. The backlight module of claim 9, wherein the inner side frame, the outer strip, and the fastener are made as one piece.

15. The backlight module of claim 9, wherein the material of the inner side frame, the material of the outer strip, and the material of the fastener are the same.

16. The backlight module of claim 9, wherein first surface is flat.

17. The backlight module of claim 9, wherein the light source comprises:
   a tube lamp; and
   a reflector attached to the inner side frame of the back plate and covering at least part of the emitting surface of the tube lamp.

18. A back plate comprising:
   a bottom plate having a periphery;
   a side frame extending upwards from the periphery of the bottom plate, and surrounding the bottom plate to form a container space, the side frame having a top edge and a bottom edge secured on the periphery of the bottom plate, wherein the top edge is directly coupled to the bottom edge, the side frame having a first surface facing the container space and a second surface opposite to the first surface;
   a folded portion having a first longitudinal side parallel to the top edge of the side frame and secured directly on the top edge of the side frame, the folded portion extending from the top edge of the inner side frame and reflexed back to the second surface of the inner side frame and thus forming a ridge extending in a direction parallel to the top edge, the ridge of the folded portion and the top edge of the inner side frame being of equal length;
   an outer strip positioned out of the container space, the outer strip having a second longitudinal side secured on and in contact with the first longitudinal side of the folded portion, wherein both the first longitudinal side of the folded portion and the second longitudinal side of the outer strip extend in a direction parallel to the bottom plate, and the first longitudinal side of the folded portion and the second longitudinal side of the outer strip are of equal length, wherein the outer strip and the bottom plate are respectively disposed at opposite sides of the inner side frame; and
   a fastener protruding from the outer strip.

19. A back plate comprising:
   a bottom plate;
   an inner side frame extending upwards from the bottom plate and having a top edge and a bottom edge, the inner side frame surrounding the bottom plate to form a container space, the inner side frame having an inner surface facing the container space and an outer surface opposite to the inner surface;
   a reflexed portion extending from the top edge of the inner side frame and reflexed back to the outer surface of the inner side frame, and thereby forming a ridge extending in a direction parallel to the top edge of the inner side frame, the ridge of the reflexed portion and the top edge of the inner side frame being of equal length;
   an outer strip positioned out of the container space, wherein the outer strip is extended downwards from the reflexed portion, so that a gap is formed between the outer strip and the inner side frame, the outer strip having a longitudinal edge parallel to the ridge of the reflexed portion, and the longitudinal edge of the outer strip and the ridge of the reflexed portion being of equal length, wherein the outer strip and the bottom plate are respectively disposed at opposite sides of the inner side frame; and
   a fastener disposed on the outer strip.

\* \* \* \* \*